(12) United States Patent
Shupp et al.

(10) Patent No.: US 9,047,183 B2
(45) Date of Patent: Jun. 2, 2015

(54) SYSTEMS AND METHODS FOR DETECTING OUTAGES IN A MEDICAL RECORD EXCHANGE SYSTEM

(71) Applicant: Department of Veterans Affairs, Washington, DC (US)

(72) Inventors: Cristopher Shupp, Belews Creek, NC (US); Gregory Bowman, Young Harris, GA (US)

(73) Assignee: DEPARTMENT OF VETERANS AFFAIRS, Washington, DC (US)

( * ) Notice: Subject to any disclaimer, the term of this patent is extended or adjusted under 35 U.S.C. 154(b) by 148 days.

(21) Appl. No.: 13/741,169

(22) Filed: Jan. 14, 2013

(65) Prior Publication Data
US 2014/0197950 A1 Jul. 17, 2014

(51) Int. Cl.
*G08B 21/00* (2006.01)
*G06F 11/07* (2006.01)

(52) U.S. Cl.
CPC .................................. *G06F 11/0709* (2013.01)

(58) Field of Classification Search
CPC ..................................................... G06F 11/0709
USPC ........................................................... 340/540
See application file for complete search history.

(56) References Cited

U.S. PATENT DOCUMENTS

| 2003/0028827 A1* | 2/2003 | Gray ............................... 714/46 |
| 2009/0013210 A1* | 1/2009 | McIntosh et al. ................. 714/4 |
| 2012/0254675 A1* | 10/2012 | Stepanenko et al. ............ 714/57 |

* cited by examiner

*Primary Examiner* — Kerri McNally
(74) *Attorney, Agent, or Firm* — Procopio Cory Hargreaves & Savitch LLP

(57) ABSTRACT

Systems and methods for detecting an issue with a message flow between two or more data systems. In an embodiment, at a first time, a number of first request messages and a number of first response messages transmitted or received during a first look-back period are determined. A first ratio is calculated based on these numbers and compared to an alerting threshold. If the first ratio is less than the alerting threshold, an alert is generated. Then, at a second time, a number of second request messages and a number of second response messages transmitted or received during a second look-back period are determined. A second ratio is calculated based on these numbers and compared to a clearing threshold. Based on this comparison, it is determined whether to maintain or clear the alert.

36 Claims, 10 Drawing Sheets

---

CHDR Data Flow Alert!

This is an automated e-mail message.

Message Traffic Alert: RED LIGHT

The VA CHDR application is experiencing data flow issues based on audited messages written in the past 10 minutes as follows:

- Z02/Z01 – Z01 count did not reach the minimum threshold of 32 which must be eclipsed in order to check response percentages. However, we are currently ignoring the minimum threshold for clearing events. Because the calculated response percentage is above the clearing percentage we are going green.
- Z04/Z03 – Response percentage below 10%.
- Z06/Z05 – Z05 count did not reach minimum threshold of 40 which must be eclipsed in order to check response percentages. However, we are currently ignoring the minimum threshold for clearing events. Because the calculated response percentage is above the clearing we are going green.
- Z07/Z06 – Z06 count did not reach the minimum threshold of 40 which must be eclipsed in order to check response percentages. However, we are currently ignoring the minimum threshold for clearing events. Because the calculated response percentage is above the clearing we are going green.

Message Counts in the Last 10 Minutes:
Z01s Sent = 0
Z02s Received = 0
Z03s Sent = 150
Z04s Received = 12
Z05s Sent = 21
Z06s Received = 17
Z07s Sent = 17

----------
Begin Date (CDT)=30-MAR-11 17:00:52
End Date (CDT)=30-MAR-11 17:10:52
(DOD_ADC_AUTOMATION_ALERT)

**DoD Patient Sharing Requests (Z01) received
are below the low water mark of 2**

This is an automated e-mail message.

Message Traffic Alert: RED LIGHT

The results of the query are (in the last 60 minutes):

Z01 Successful ADC Count=0
Z01 Failure ADC Count=0

The low water mark is 2.
The low water mark clearing is 25.
The high water mark is 235.
The high water mark clearing is 200.

----------
Begin Date (CDT)=27-MAR-11 00:01:09
End Date (CDT)=27-MAR-11 01:01:09
(DOD_ADC_AUTOMATION_ALERT)

FIG. 3A

DOD PATIENT SHARING REQUESTS (Z01) RECEIVED SUCCESSFULLY!!

This is an automated e-mail message.

Message Traffic Alert: GREEN LIGHT

The count of Z01s received is within the expected parameters
The results of the query are (in the last 60 minutes):

Z01 Successful ADC Count=155
Z01 Failure ADC Count=0

The low water mark is 2.
The low water mark clearing is 25.
The high water mark is 235.
The high water mark clearing is 200.

----------
Begin Date (CDT)=27-MAR-11 02:20:55
End Date (CDT)=27-MAR-11 03:20:55
(DOD_ADC_AUTOMATION_ALERT)

FIG. 3B

DoD Patient Sharing Requests (Z01) received are above the high water mark of 235

This is an automated e-mail message.

Message Traffic Alert: RED LIGHT

The results of the query are (in the last 60 minutes):

Z01 Successful ADC Count=238
Z01 Failure ADC Count=0

The low water mark is 2.
The low water mark clearing is 25.
The high water mark is 235.
The high water mark clearing is 200.

----------
Begin Date (CDT)=25-MAR-11 19:51:04
End Date (CDT)=25-MAR-11 20:51:04
(DOD_ADC_AUTOMATION_ALERT)

FIG. 3C

DOD PATIENT SHARING REQUESTS (Z01) RECEIVED SUCCESSFULLY!!

This is an automated e-mail message.

Message Traffic Alert: GREEN LIGHT

The count of Z01s received is within the expected parameters
The results of the query are (in the last 60 minutes):

Z01 Successful ADC Count=188
Z01 Failure ADC Count=0

The low water mark is 2.
The low water mark clearing is 25.
The high water mark is 235.
The high water mark clearing is 200.

----------
Begin Date (CDT)=25-MAR-11 21:11:01
End Date (CDT)=25-MAR-11 22:11:01
(DOD_ADC_AUTOMATION_ALERT)

FIG. 3D

CHDR Data Flow Alert!

This is an automated e-mail message.

Message Traffic Alert: RED LIGHT

The VA CHDR application is experiencing data flow issues based on audited messages written in the past 10 minutes as follows:

- Z02/Z01 – Z01 count did not reach the minimum threshold of 32 which must be eclipsed in order to check response percentages. However, we are currently ignoring the minimum threshold for clearing events. Because the calculated response percentage is above the clearing percentage we are going green.
- Z04/Z03 – Response percentage below 10%.
- Z06/Z05 – Z05 count did not reach minimum threshold of 40 which must be eclipsed in order to check response percentages. However, we are currently ignoring the minimum threshold for clearing events. Because the calculated response percentage is above the clearing we are going green.
- Z07/Z06 – Z06 count did not reach the minimum threshold of 40 which must be eclipsed in order to check response percentages. However, we are currently ignoring the minimum threshold for clearing events. Because the calculated response percentage is above the clearing we are going green.

Message Counts in the Last 10 Minutes:
Z01s Sent = 0
Z02s Received = 0
Z03s Sent = 150
Z04s Received = 12
Z05s Sent = 21
Z06s Received = 17
Z07s Sent = 17

----------
Begin Date (CDT)=30-MAR-11 17:00:52
End Date (CDT)=30-MAR-11 17:10:52
(DOD_ADC_AUTOMATION_ALERT)

FIG. 5A

CHDR Data Flow Alert!

This is an automated e-mail message.

Message Traffic Alert: GREEN LIGHT

The VA CHDR message flow has resumed with messages written in the past 10 minutes as follows:

- Z02/Z01 – Z01 count did not reach the minimum threshold of 32 which must be eclipsed in order to check response percentages. However, we are currently ignoring the minimum threshold for clearing events. Because the calculated response percentage is above the clearing percentage we are going green.
- Z04/Z03 – Response percentage is above the clearing percentage of 20%.
- Z06/Z05 – Z05 count did not reach minimum threshold of 40 which must be eclipsed in order to check response percentages. However, we are currently ignoring the minimum threshold for clearing events. Because the calculated response percentage is above the clearing we are going green.
- Z07/Z06 – Z06 count did not reach the minimum threshold of 40 which must be eclipsed in order to check response percentages. However, we are currently ignoring the minimum threshold for clearing events. Because the calculated response percentage is above the clearing we are going green.

Message Counts in the Last 10 Minutes:
Z01s Sent = 0
Z02s Received = 0
Z03s Sent = 1008
Z04s Received = 467
Z05s Sent = 1
Z06s Received = 10
Z07s Sent = 10

----------
Begin Date (CDT)=30-MAR-11 19:51:14
End Date (CDT)=30-MAR-11 20:01:14
(DOD_ADC_AUTOMATION_ALERT)

FIG. 5B

| Users ▽ | Jobs ▽ | Services ▽ | Logout |

*Department of Veterans Affairs*

Current user is: user1
Current Credentials: credentials1
Job Engine Status: Running
Current Server Time: 03/30/11 at 07:47pm

Trackable Jobs Listing

Auto Refresh: On

| Job code | Short Description | Last Completed | Status | Alert Start | Elapsed Time |
|---|---|---|---|---|---|
| DOD_ADC_AUTOMATION_ALERT | ADC Automation Alert*** | 03/30/2011 20:41:09 EDT | ● | 03/30/2011 20:31:17 EDT | 16m 03s |
| DUPLICATION_ALERT | Duplication Alert*** | 03/30/2011 20:41:10 EDT | ○ | 01/14/2011 20:00:47 EDT | 75d 00h 46m 33s |
| EPAGENT_CHECK | Introscope Agent check | 03/30/2011 20:31:01 EDT | ○ | 03/14/2011 14:12:13 EDT | 16d 06h 35m 07s |
| HDR_ALERT | HDR Alert*** | 03/30/2011 20:45:18 EDT | ● | 03/30/2011 17:15:18 EDT | 03h 32m 02s |
| MPI_ALERT | MPI Alert*** | 03/30/2011 20:41:08 EDT | ○ | 03/29/2011 01:50:42 EDT | 01d 18h 56m 38s |
| NO_DOD_TRAFFIC | No DoD Traffic | 03/30/2011 20:41:07 EDT | ● | 03/30/2011 20:21:04 EDT | 26m 16s |
| NO_Z04_MESSAGES_RECEIVED | No Z04 Messages Received from DoD | 03/30/2011 20:40:57 EDT | ○ | 03/30/2011 19:41:00 EDT | 01h 06m 20s |
| TRAFFIC_FLOW_ALERT_DOD | DoD Traffic Flow*** | 03/30/2011 20:41:10 EDT | ● | 03/30/2011 19:41:13 EDT | 01h 06m 07s |
| TRAFFIC_FLOW_ALERT_VA | VA Traffic Flow*** | 03/30/2011 20:41:10 EDT | ● | 03/30/2011 18:10:55 EDT | 02h 36m 25s |
| VISTA_ALERT | VISTA Alert*** | 03/30/2011 20:41:02 EDT | ○ | 03/30/2011 20:21:17 EDT | 26m 03s |
| Z03_Z04_FREQ_TRAFFIC_CHECK | Z03/Z04 Correlation Traffic Check | 03/30/2011 20:41:05 EDT | ● | 03/30/2011 19:11:04 EDT | 01h 36m 16s |

CHDR Production Support

Done

FIG. 6

SYSTEMS AND METHODS FOR DETECTING OUTAGES IN A MEDICAL RECORD EXCHANGE SYSTEM

BACKGROUND

1. Field of the Invention

The invention is generally directed to detecting outages between two or more communicating systems, and, more particularly, to detecting outages within a medical record exchange system using flow analysis.

2. Description of the Related Art

In some data systems there is a need to exchange information with a separate, distinct data system over one or more communication channels. These data systems may be managed by two or more independent entities, and the exchange of information may comprise the communication of information between separate repositories maintained by these independent entities.

For example, the Clinical Health Data Repository (CHDR) of the Department of Veteran Affairs ("VA") must frequently exchange information with a CHDR system of the Department of Defense ("DoD"). At its core, the CHDR of the VA is a medical record exchange system that maintains synchronization of a certain set of patients' medical records, i.e., records marked as "Active Dual Consumer" (ADC). These records are synchronized between the DoD's Clinical Data Repository (CDR) system and the VA's Health Data Repository (HDR) through interactions with and between the agencies' separate CHDR systems. Once a patient is marked as ADC, the patient's medical records are synchronized between the two agencies. Consequently, whenever the patient's medical records are updated in the repository of one agency, the medical records must also be updated in the repository of the other agency.

Seven message types are utilized for the exchange of information between the two distinct CHDR systems of the VA and DoD. The messages, termed "Z messages," allow for the marking of a patient as ADC, and provide for the exchange of clinical data related to ADC-marked patients. Specifically, "Z01" and "Z02" messages provide for the marking of a patient for clinical data sharing, "Z05," "Z06," and "Z07" messages provide for a batch exchange of marked patients' past medical data, and "Z03" and "Z04" messages provide for the continual exchange of current medical data going forward. Each of these messages is exchanged in the form of an eXtensible Markup Language (XML) Health-Level 7 (HL7) message, which is the standard message format for medical record data. Each Z-message may be described as follows:

Z01 message: The ADC process for each patient is initiated within either agency (e.g., VA and/or DoD)—or, more specifically, the CHDR system of either agency—via transmission of a Z01 message to the other CHDR system. This message comprises a payload which includes a patient's traits information, such as name, date of birth, Social Security number, and the like. This traits information can be used by the receiving system to verify the existence of the patient in its respective medical data system. For example, the receiving system may utilize at least a portion of the traits information to generate a query for a respective data repository (e.g., one or more databases). If the patient exists within the data repository, an indication of the patient's existence and status or non-existence is returned in response to the query, in the form of a Z02 message.

Z02 message: This message is transmitted in response to a Z01 message received by either CHDR system. Based on the query results using the traits information passed in the corresponding Z01 message, the ADC status of the patient is determined. If a patient was identified by the query, the patient may be marked as ADC active. The Z02 response is then returned to the initiating CHDR system (i.e., the system which transmitted the Z01 message) to notify the initiating CHDR system that information exchange and synchronization may commence for this patient. However, if an ADC match is not found, a Z02 response is returned notifying the initiating CHDR system of a no-match condition.

Z03 message: This message may be transmitted from one CHDR system to the other CHDR system to initiate an update of an ADC patient's medical record at the other system. As ADC patients receive care at either agency's medical facilities, their clinical data is updated within the treating agency's repository. These updates are sent from the treating agency's repository or CHDR to the other agency's CHDR. For example, the payload of the Z03 message may comprise patient information (e.g., to facilitate identification of the patient within the receiving system's repository), as well as the updates to the patient information, such as pharmacy data, allergy data, laboratory data, and the like. Thus, the Z03 message represents a clinical update, with data being exchanged between the agencies' CHDR systems.

Z04 message: This message is transmitted in response to a Z03 clinical update message, and verifies receipt and processing of the Z03 message by the system which received the Z03 message.

Z05 message: This message may be transmitted from one CHDR system to the other CHDR system to initiate a one-time batch exchange of clinical data. The initiating system sends the Z05 message to the other system to request a patient's medical data. The message payload may comprise a synchronization flag indicating that the receiving system should send a corresponding Z05 message to the initiating system in order to complete the batch exchange of data for the patient. Upon receiving the Z05 message, the receiving system may verify the existence of the ADC patient (e.g., by querying a respective data repository) in order to package the patient's clinical data in a Z06 response message, described below.

Z06 message: This message is transmitted in response to a Z05 message received by either CHDR system. The message payload may comprise all or a portion of the patient's clinical data contained in a data repository of the transmitting system. Due to the potential amount of clinical data for a patient, the size of a message comprising all such data may be too large, according to some policy, implementation, or limitation of the system or a network between the two systems. Thus, in such a case, multiple Z06 messages may be sent in response to a single Z05 batch exchange request in order to transmit the patient's full medical record.

Z07 message: This message may be transmitted by a system which previously transmitted a Z05 message, once all Z06 messages have been received and processed by the system. Accordingly, the Z07 message indicates that the complete medical record of an ADC patient has been received, and completes a batch exchange of clinical data for the patient.

Historically, information technology centers have hunted for outages by checking for down servers, hung processes, or network traffic. While these techniques are capable of detecting some issues, they are incapable of detecting outages in message flow, for example, during exchange of the Z-messages described above or during exchange of other types of response-request messages. For example, if a first system is initiating requests for data to a remote, separately-operated second system, and the second system is not returning responses, there are no standard information technology techniques available to the first system to determine the issue at the second system.

SUMMARY

Accordingly, systems and methods are disclosed for a system health alert monitoring utility, which automates the detection of potential outages for two or more distinct systems, and generates reports that enable analysis of traffic flow between the systems. These reports may take the form of e-mail-based and/or web-based alerts, as well as real-time graphical charts and other displays. Advantageously, the disclosed systems and methods automate the monitoring of overall system health, provide a real-time view into electronic messages as they are exchanged and passed through the system, and assist in outage detection, verification of the termination of outages, verification that upgrades have been successfully installed, and the like.

In an embodiment, a method for detecting an issue with a message flow between two or more data systems is disclosed. The method comprises, by at least one hardware processor of a first data system: at a first time, determining a number of first request messages transmitted during a first look-back period, determining a number of first response messages received during the first look-back period, calculating a first ratio of the number of first response messages to the number of first request messages, comparing the first ratio to an alerting threshold, and, generating a first alert based on the comparison of the first ratio to the alerting threshold; and, at a second time, after the first time and after the alert has been generated, determining a number of second request messages transmitted during a second look-back period, determining a number of second response messages received during the second look-back period, calculating a second ratio of the number of second response messages to the number of second request messages, comparing the second ratio to a clearing threshold, and determining whether to maintain or clear the alert based on the comparison of the second ratio to the clearing threshold.

In an additional embodiment, a system for detecting an issue with a message flow between two or more data systems is disclosed. The system comprises: at least one hardware processor; and at least one executable software module that, when executed by the at least one hardware processor, at a first time, determines a number of first request messages transmitted during a first look-back period, determines a number of first response messages received during the first look-back period, calculates a first ratio of the number of first response messages to the number of first request messages, compares the first ratio to an alerting threshold, and, generates a first alert based on the comparison of the first ratio to the alerting threshold, and, at a second time, after the first time and after the alert has been generated, determines a number of second request messages transmitted during a second look-back period, determines a number of second response messages received during the second look-back period, calculates a second ratio of the number of second response messages to the number of second request messages, compares the second ratio to a clearing threshold, and determines whether to maintain or clear the alert based on the comparison of the second ratio to the clearing threshold.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 3A-3D illustrates example notifications, according to an embodiment;

FIGS. 5A and 5B illustrate example notifications, according to an embodiment;

FIGS. 6 and 7 illustrate example user interfaces, according to an embodiment.

DETAILED DESCRIPTION

In an embodiment, systems and methods are disclosed for detecting outages within an information exchange system using flow analysis. While embodiments will primarily be described herein in the context of communications between the two clinical health data repositories discussed above, it should be understood that these and other embodiments are not limited to any single context. Rather, the embodiments described herein may be easily extended for any system which exchanges information with a separate, distinct system. For example, systems and processes described in the context of Z01/Z02 and/or Z03/Z04 message exchanges may be generalized for any pair of request and response messages. The names of the various Z-messages are merely being retained throughout the disclosure for the purposes of clarity and simplified understanding. Furthermore, while the embodiments described herein are primarily discussed in the context of two systems, it should be understood that the disclosed systems and methods may be generalized for message flows between three or more systems.

System Overview

Figure 1:
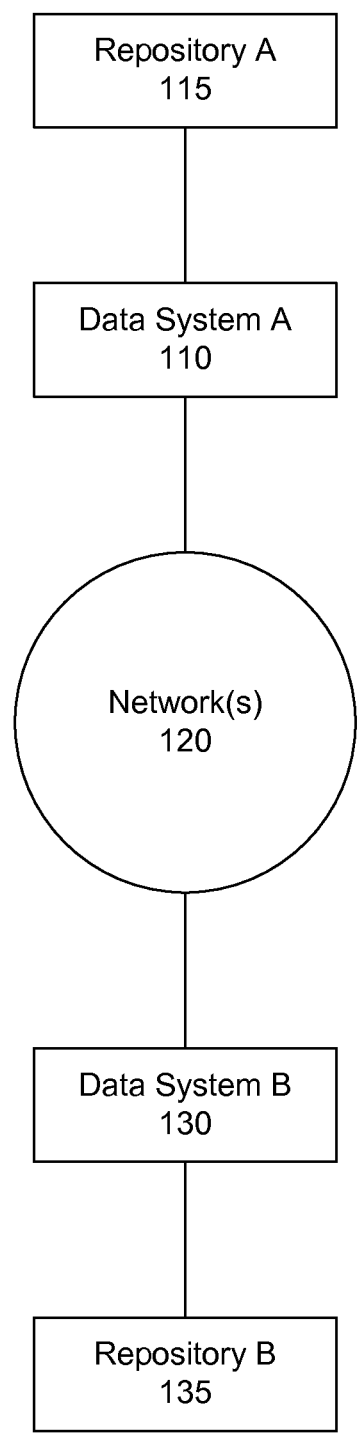
FIG. 1 illustrates a configuration of a system, according to an embodiment.

FIG. 1 illustrates an example medical record exchange system, according to an embodiment. The system may comprise a set of two or more data systems, including Data System A 110 and Data System B 130. Each of these data systems 110 and 130 may comprise one or more servers which host and/or execute one or more of the various functions, processes, and/or software modules described herein. Each of data systems 110 and 130 may also host or be otherwise communicatively coupled to a data repository. For example, Data System A 110 may be communicatively coupled to Repository A 115, and Data System B 130 may be communicatively coupled to Repository B 135. Each data system may act as a middleman, controlling and managing access (e.g., reads and writes) to its respective repository. Repository A 115 and Repository B 135 may each comprise one or more databases, including relational databases.

In addition, data systems 110 and 130 are communicatively connected to each other via one or more network(s) 120. Network(s) 120 may comprise the Internet, and data systems 110 and 130 may communicate with each other through the Internet using standard transmission protocols, such as HyperText Transfer Protocol (HTTP), Secure HTTP (HTTPS), File Transfer Protocol (FTP), and the like. In an embodiment, one or more server(s) of data systems 110 and/or 130 may not be dedicated servers, and may instead be cloud instances, which utilize shared resources of one or more servers. While only two data systems 110 and 130 are illustrated, it should be understood that the network may comprise any number of data systems, including a Data System C, Data System D, and so on.

Data systems 110 and/or 130 may comprise web servers which host one or more internally-accessible (e.g., accessible via an intranet) and/or externally-accessible (e.g., accessible via the Internet) websites or web services. In embodiments in which a website is provided, the website may comprise one or more user interfaces, including, for example, web pages generated in HyperText Markup Language (HTML) or other language. The data system(s) may transmit or serve these user interfaces in response to requests from user systems (not shown). In some embodiments, these user interfaces may be served in the form of a wizard, in which case two or more user interfaces may be served in a sequential manner, and one or more of the sequential user interfaces may depend on an interaction of the user or user system with one or more preceding user interfaces. The requests to the data system(s) and the responses from the data system(s), including the user interfaces, may both be communicated through network(s) 120, which may include the Internet, using standard communication protocols (e.g., HTTP, HTTPS), and/or through one or more intranets (not shown). These user interfaces or web pages may comprise a combination of content and elements, such as text, images, videos, animations, charts, references (e.g., hyperlinks), frames, inputs (e.g., textboxes, text areas, checkboxes, radio buttons, drop-down menus, buttons, forms, etc.), scripts (e.g., JavaScript), and the like. The data system(s) may also respond to other requests from user systems. For example, a user system may submit data (e.g., user data, form data, etc.) to be stored in one or more databases locally and/or remotely accessible to the data system(s), such as repositories 115 and/or 135. Any suitable database may be utilized, including without limitation MySQL, Oracle, IBM, Microsoft SQL, Sybase, Access, and the like, including cloud-based database instances. Data may be sent to the data system(s), for instance, using the well-known POST request supported by HTTP. This data, as well as other requests, may be handled, for example, by server-side web technology, such as a servlet, executed by the data system(s)

In embodiments in which a web service is provided, Data System A 110 and/or Data System B 130 may receive requests from another data system or user system(s), and provide responses in XML and/or any other suitable or desired format. In such embodiments, the data system(s) may provide an application programming interface (API) which defines the manner in which other systems may interact with the web service. Thus, the other systems, which may themselves comprise one or more servers, can define their own user interfaces, and rely on the web service to implement one or more backend processes, functionality, data exchanges, etc., described herein.

First Example Embodiment

One embodiment of a system that can generate an alert for an outage or other issue will now be described. In a situation where medical records or other types of data are automatically synchronized between two systems, the systems generally must exchange a plurality of messages. For example, in the two-CHDR system described above, the DoD CHDR will transmit a plurality of Z01 messages to the VA CHDR. If the DoD CHDR sends too few messages, this may indicate an outage, and an alert should be generated. Conversely, if the DoD CHDR sends too many messages, this may indicate a different issue, and an alert should be generated. However, neither of these issues can be reliably detected via conventional network checks, since other clinical traffic may be on the network. Nor can these issues be detected by a babysitting process at the VA CHDR, since the DoD CHDR is responsible for its own ADC automation processes. Accordingly, in an embodiment, an alert may be configured as a software or hardware module ("job") that executes upon a user-defined schedule. For example, the job may run every ten minutes (or other time interval) to check for outages. Additionally or alternatively, the job may be executed in response to a user interaction within a user interface to the CHDR monitoring subsystem.

The job may be at least partially defined by a configuration file which defines a value for one or more environment variables or other parameters. These parameter values may be user-definable through one or more user interfaces with or without default values, and/or may be system-defined. For example, in some embodiments, the system may automatically define the parameter values based on statistical analysis of historical message flow metrics. The statistical analysis may be performed using any number of conventional methods or algorithms. In alternative embodiments, the parameter values may be set by a user (e.g., business analyst) based on the user's statistical analysis of historical message flows or using some other method of determining appropriate parameter values. Table 1 illustrates some example parameters with example values:

TABLE 1

| Parameter | Value |
|---|---|
| low_water_mark | 2 |
| high_water_mark | 235 |
| low_water_mark_clearing_count | 25 |
| high_water_mark_clearing_count | 200 |
| look_back | 60 |

In this illustrative, non-limiting example, the job is configured to alert if, after the time period specified by the look_back parameter (i.e., sixty minutes) and examining all message traffic for that period (e.g., all Z01 message traffic from the DoD CHDR within the last sixty minutes), the number of messages received is below the value specified by the low_water_mark parameter (i.e., two). For example, if the number of messages (e.g., Z01 messages) over the last sixty minutes was less than two, the job will generate an alert.

This generated alert will not clear until the job detects a look-back period during which a number of messages received exceeds the value specified by the low_water_mark_clearing_count (i.e., twenty-five). For example, the job will look back during a subsequent sixty minute period and examine all message traffic for that period. If the number of messages (e.g., Z01 messages) over that sixty minute period exceeds twenty-five, the job will clear the alert. Otherwise, if the number of messages is less than or equal to twenty-five, the alert will be regenerated or maintained.

The illustrated job is also configured to alert if, after the time period specified by the look_back parameter (i.e., sixty minutes) and examining all message traffic for that period (e.g., all Z01 message traffic from the DoD CHDR within the last sixty minutes), the number of messages received is above the value specified by the high_water_mark parameter (i.e., two-hundred thirty-five). For example, if the number of messages (e.g., Z01 messages) over the last sixty minutes was greater than two-hundred thirty-five, the job will generate an alert.

This generated alert will not clear until the job detects a look-back period during which a number of messages received is less than the value specified by the high_water_mark_clearing_count (i.e., two-hundred). For example, the job will look back during a subsequent sixty minute period and examine all message traffic for that period. If the number of messages (e.g., Z01 messages) over that sixty minute period is less than two-hundred, the job will clear the alert. Otherwise, if the number of messages is greater than or equal to two-hundred, the alert will be regenerated or maintained.

Clearing parameters, such as the low_water_mark_clearing_count and high_water_mark_clearing_count parameters, provide stability in the alarming system. For example, in the absence of the low_water_mark_clearing_count parameter, if the number of messages received during consecutive look-back periods hovers between one and two, the system may switch between an alarm condition and a clearing condition with each job run. The use of clearing parameters mitigates this ping-pong effect.

It should be understood that the values for the various parameters described in this embodiment and other embodiments (e.g., embodiment described below) may represent inclusive values relative to an alert condition, rather than inclusive values relative to the non-alert condition. In other words, as an example, the alert may be triggered when the number of messages is less than or equal to the low_water_mark value, rather than just when the number of messages is less than the low_water_mark value. Similarly, the alert may be triggered when the number of messages is greater than or equal to the high_water_mark value, rather than just when the number of messages is greater than the high_water_mark value. It should also be understood that the job described in this embodiment may be utilized for any type of message, such as any of the Z-messages described above, or any other message type which a system expects to receive.

In an embodiment, as messages are received (e.g., by a CHDR), an indication of the message may be stored in a log file, or a relational database management system (RDBMS), and is associated with a timestamp. Alternatively, a counter may be maintained which is incremented each time a message is received. Separate counters may be maintained for different types of messages. When a job executes (e.g., according to a predetermined schedule or in response to a user interaction), it may review the logs to count the number of messages for a particular message type received during the look-back period, or it may retrieve the value of the counter and reset the counter for the next job execution. Alternatively, the job could be a continuously executing thread or other continuously executing module, which itself counts the number of messages received for each message type.

In an embodiment, the state of the message traffic may be shared between job executions. For example, the state from one job execution may be passed to the next job execution. The potential states may comprise: "normal," "above high water mark," "below low water mark," "between low water mark and low water mark clearing count," and/or "between high water mark clearing count and high water mark." This enables the subsequent job to determine whether or not it should clear any previously generated alarms.

In an embodiment, the alert comprises updating a status associated with the system and/or the message type(s) being monitored. For example, in the event that an alert is generated or present, a status of the system or message type(s) may be set to "RED," and when the alert is cleared or not present, the status of the system or message type(s) may be set to "GREEN." In addition, generation of the alert, and/or maintenance of the alert from one execution of the job to another execution of the job, may generate the transmission of a notification (e.g., e-mail, Short Message Service (SMS) message, etc.) or other message to one or more personnel or interfaces of an internal or external system responsible for managing such alerts. In an embodiment, the result of each job execution may be transmitted to one or more personnel or interfaces, regardless of whether an alert is present.

Figure 2:
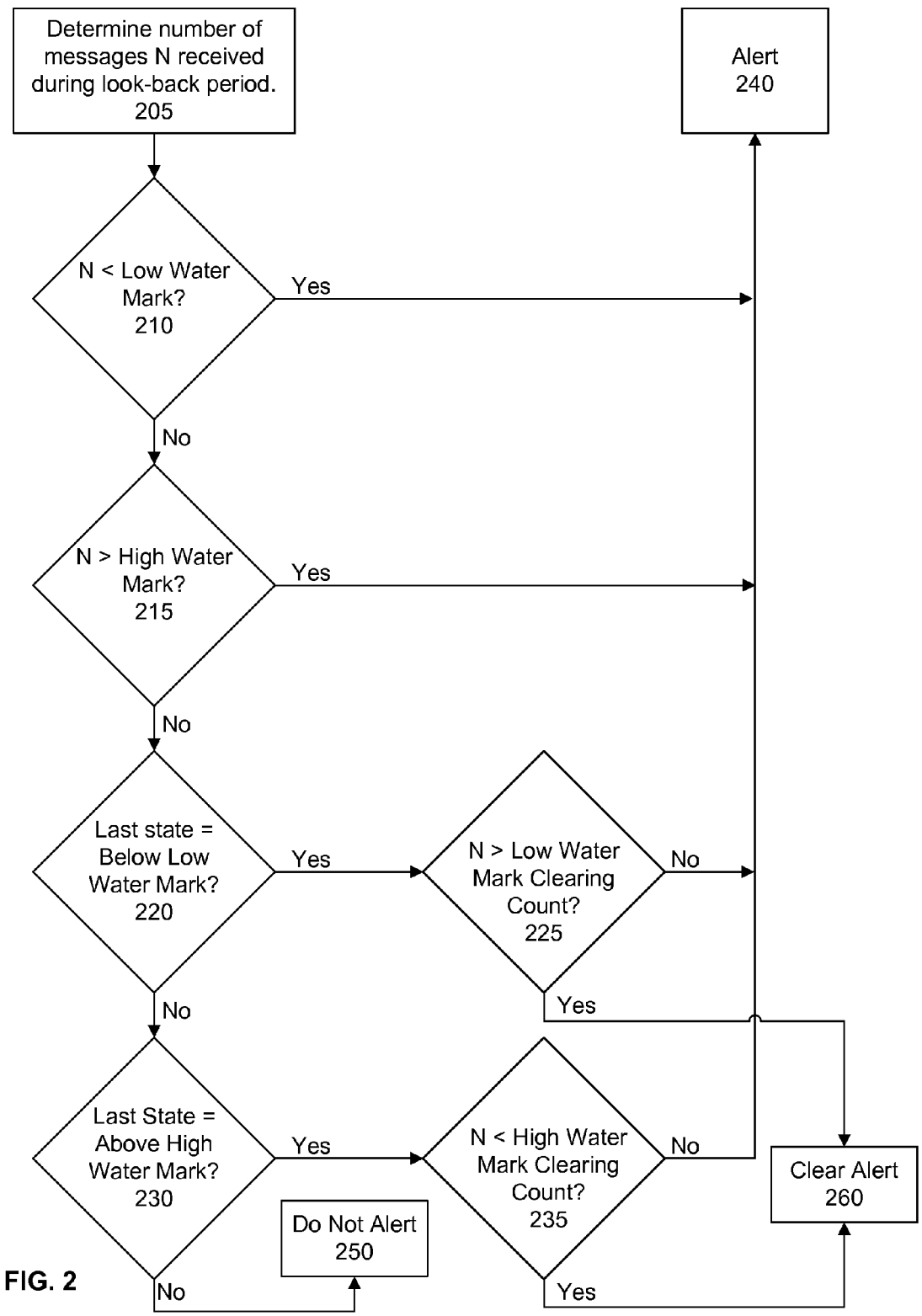
FIG. 2 illustrates a process for detecting an issue, such as an outage, in a system, according to an embodiment.

FIG. 2 illustrates a process for outage or issue detection, according to an embodiment. Initially, in step 205, the job determines the number of messages received during the applicable look-back period. In step 210, the number of messages is compared to the low water mark. If the number of messages is less than the low water mark, an alert is generated in step 240. Otherwise, in step 215, the number of messages is compared to the high water mark. If the number of messages exceeds the high water mark, an alert is generated in step 240.

In step 220, the state of the last job execution is retrieved. If the last job execution determined that the number of messages received during the former look-back period was below the low water mark (i.e., an alert was generated for the preceding look-back period), the number of messages of the current look-back period is compared to the low water mark clearing count in step 225. If the number of messages exceeds the low water mark clearing count, the job clears the alert in step 260. Otherwise, an alert is generated or maintained in step 240.

In step 230, the state of the last job execution is retrieved. If the last job execution determined that the number of messages received during the former look-back period was above the high water mark (i.e., an alert was generated for the preceding look-back period), the number of messages of the current look-back period is compared to the high water mark clearing count in step 235. Otherwise, no alert is generated, as illustrated by step 250. In step 235, if the number of messages is less than the high water mark clearing count, the job clears the alert in step 260. Otherwise, an alert is generated or maintained in step 240.

It should be understood that steps 210, 215, 220, and 230 are not limited to the particular order illustrated in FIG. 2, and may be performed in any order. Furthermore, steps 220 and 225 may be performed in any order. Similarly, steps 230 and 235 may also be performed in any order. Other combinations of steps and orders of steps are also possible.

FIGS. 3A-3D illustrate example messages which may be transmitted by the described job. FIG. 3A illustrates an alert message that may be transmitted to one or more responsible personnel to notify them that the number of Z01 messages is below the low_water_mark threshold value. FIG. 3C illustrates an alert message that may be transmitted to one or more responsible personnel to notify them that the number of Z01 messages is above the high_water_mark threshold value. FIGS. 3B and 3D illustrate example messages that may be transmitted to notify one or more responsible personnel that the number of Z01 messages is within applicable threshold values. These messages may be sent, for example, when an alert is cleared, i.e., when the number of messages detected over a look-back period passes an applicable clearing count following an alert.

Second Example Embodiment

A second embodiment of a system that can generate an alert for an outage or other issue, using message flow analysis, will now be described in the context of the Z03 and Z04 messages described above. In this embodiment, an alert makes use of a handshake paradigm to set expectations for message flow. If these expectations are not met, then an alert is generated.

For ease of illustration, the system will be described in the context of Data System A 110 (e.g., the VA's CHDR) initiating a handshake with Data System B 130 (e.g., the DoD's CHDR), with Data System A 110 performing the issue-detection process. However, it should be understood that the disclosed embodiment can be identically applied to Data System B 130 initiating a handshake with Data System A 110, with Data System B 130 performing the issue-detection process. The disclosed embodiment can also be identically applied to Data System B 130 initiating a handshake with Data System A 110, with Data System A 110 performing the issue-detection process, and to Data System A 110 initiating a handshake with Data System B 130, with Data System B 130 performing the issue-detection process. In each case, the handshake comprises a request message and a response message. For purposes of simplified illustration, embodiments will be described herein in the context of the Z-messages discussed above. Specifically, the Z03 message is the request message, the Z04 is the response message, and the combination of the Z03 message and the Z04 message comprises a handshake. It should be understood that the embodiments described herein may be equally applied to other request-response message pairs, including Z01-Z02 message pairs, Z05-Z06 message pairs, Z06-Z07 message pairs, and other request-response message pairs known in the art or used in the future.

The issue detection process may take the form of a software module ("job") executing on one of the data systems. In the described case, it is assumed that the job is being executed by Data System A 110. This job may be executed continuously (e.g., as a thread), may be executed periodically on a user-defined or system-defined schedule, and/or may be executed manually in response to a user interaction with a user interface of Data System A 110. As discussed above, the job may be at least partially defined by a configuration file which defines a value for one or more environment variables or other parameters. Table 2 illustrates some example parameters with example values:

TABLE 2

| Parameter | Value |
|---|---|
| low_water_mark | 1 |
| percentage | 10 |
| clearing_percentage | 20 |
| message_minimum | 40 |
| look_back | 10 |

As before, the look_back parameter defines the amount of time through which the job should look back to collect message metrics, such as the number of messages received and/or transmitted. In this example, the job will look back over the preceding ten minutes, and determine the number of Z03 messages transmitted by the system 110 and the number of Z04 messages received by the system 110 during that preceding ten minutes.

In an embodiment, the objective is to pick a look_back parameter value that represents a sufficient amount of time to gather a statistically significant amount of messages for analysis. For instance, a Poisson distribution may be assumed. The Poisson distribution is a discrete probability distribution that expresses the probability of a given number of events occurring in a fixed interval of time and/or space, if these events occur with a known average rate and independently of the time since the last event. The Poisson distribution can be used to illustrate how a larger look-back period makes false alerts less likely. For example, suppose ten Z03 messages per minute are expected. In ten minutes, one-hundred Z03 messages would be expected. Since each of these messages expects at least one response (i.e., Z04 message) in near-real time, a false alert can happen if the majority of Z04 messages are received at the end of the sampling interval. Thus, increasing the look-back period decreases the number of false alerts. However, increasing the look-back period also increases how long it takes for the system to detect an outage or other issue. One goal may be to select a look-back parameter value that appropriately balances these countervailing interests.

Continuing with the example in Table 2, the low_water_mark parameter is one. Thus, if the job detects that zero (i.e., less than one) Z03 messages have been transmitted by Data System A 110 during the look-back period defined in the look-back parameter, a "no traffic" alert can be generated. In an embodiment, if the low_water_mark parameter is set to a value of zero, then the "no traffic" alert is effectively disabled. In other words, no alert would be generated solely because a job detects that no Z03 messages have been transmitted by Data System A 110 during the look-back period. However, the job may still generate an alert due to other conditions being satisfied, as discussed below, or another independently executing job may be configured to generate a "no traffic" alert or similar alert.

The percentage parameter defines the ratio, as a percentage, that must be met to prevent an alarm condition from occurring. For example, in this case, the percentage parameter is defined as ten percent. Thus, in the context of Z03 and Z04 messages, if one-hundred Z03 messages (i.e., request messages) were transmitted during the look-back period, eleven or more Z04 messages (i.e., response messages) must be received during the same look-back period to avoid the occurrence of an alarm condition. In other words, the ratio of Z04 messages received to Z03 messages transmitted must be greater than ten percent; otherwise, an alert will be generated.

The clearing_percentage parameter defines the ratio, as a percentage, that must be met to clear an alarm (e.g., set by a previous job execution over a prior look-back period). For example, in this case, the clearing_percentage parameter is defined as twenty percent. Thus, in the context of Z03 and Z04 messages, if the last job execution resulted in an alarm and if one-hundred Z03 messages (i.e., request messages) were transmitted during the look-back period, twenty-one or more Z04 messages (i.e., response messages) must be received during the same look-back period to clear the prior alarm condition. In other words, the ratio of Z04 messages received to Z03 messages transmitted must be greater than twenty percent, otherwise, a previously set alert will be regenerated or maintained.

The message_minimum parameter defines the minimum number of messages that must be detected during the look-back period to trigger the alarming conditions. In other words, the message_minimum parameter can be used to restrict when the percentage parameter is checked. For example, in this case the message_minimum parameter value is forty. Thus, if the number of Z03 messages transmitted by Data System A 110 during the look-back period is less than forty, the job does not compare the ratio of Z04 messages to Z03 messages. For example, if thirty Z03 messages were transmitted and two Z04 messages were received, no alert would be generated by the job (although the job may maintain a previous alert), even though the ratio of Z04 messages to Z03 messages is less than ten percent, since fewer than forty Z03 messages (i.e., the value of the message_minimum parameter) were transmitted. In this case, the prior status may be maintained. That is, if the prior status was an alert status, then the status remains an alert status, and if the prior status was a non-alert status, then the status remains a non-alert status.

In an embodiment, the message_minimum parameter value may represent a statistically significant number of messages relative to the applicable look-back period. In other words, if the number of messages is less than the message_minimum parameter value, the number is not statistically adequate relative to the look-back period to motivate an alert condition based on the applicable ratios (e.g., percentage parameter value). For example, in the present example, if thirty Z03 request messages were transmitted during the look-back period, the number of Z04 response messages received during the look-back period is irrelevant, since a statistically significant number of Z03 request messages was not transmitted during the look-back period.

The minimum statistically significant number of messages may be determined using conventional statistical analysis methods or algorithms, and may be computed automatically by Data System A 110 or manually by a business analyst. In either case, the minimum may be calculated based on historical message flow metrics. Generally, the message_minimum parameter value should be greater than zero and as large as possible to avoid false alerts caused by violations of the request-response message ratio. In addition, generally, as the look-back period increases, the message_minimum parameter value should also increase.

In an embodiment, the requirement for a statistically significant number of messages, as defined by the message_minimum parameter, may be ignored in the case of clearing an alert. This may be a user-defined or system setting (e.g., defined by a Boolean or other binary data type), and may be modifiable. In the case that the message_minimum parameter is to be ignored in the case of clearing an alert, an alert can be cleared if the ratio of Z04 messages received to Z03 messages transmitted exceeds the clearing_percentage parameter value, regardless of the number of Z03 messages received (i.e., even if less than the number of Z03 messages defined by the message_minimum parameter were transmitted during the applicable look-back period). Using the present example, if the last job execution resulted in an alert condition, and the current job execution determines that thirty Z03 messages were transmitted in the current look-back period and that fifteen Z04 messages were received in the current look-back period (i.e., a ratio of fifty percent), the alert would be cleared. This is the case, even though the thirty Z03 messages may not be a statistically significant number of messages for the purposes of determining an alert condition.

In an embodiment, the configuration file may also comprise a direction parameter, which defines the direction of the message flow or handshakes being monitored. For example, this parameter may be a Boolean or other binary data type. If the parameter value is set to one value (e.g., "true" or one), the job monitors Z03 messages transmitted by Data System A 110 to Data System B 130 and/or Z04 messages received by Data System A 110 from Data System B 130. On the other hand, if the parameter value is set to the other value (e.g., "false" or zero), the job monitors Z03 messages received by Data System A 110 from Data System B 130 and/or Z04 messages transmitted by Data System A 110 to Data System B 130.

Figure 4:
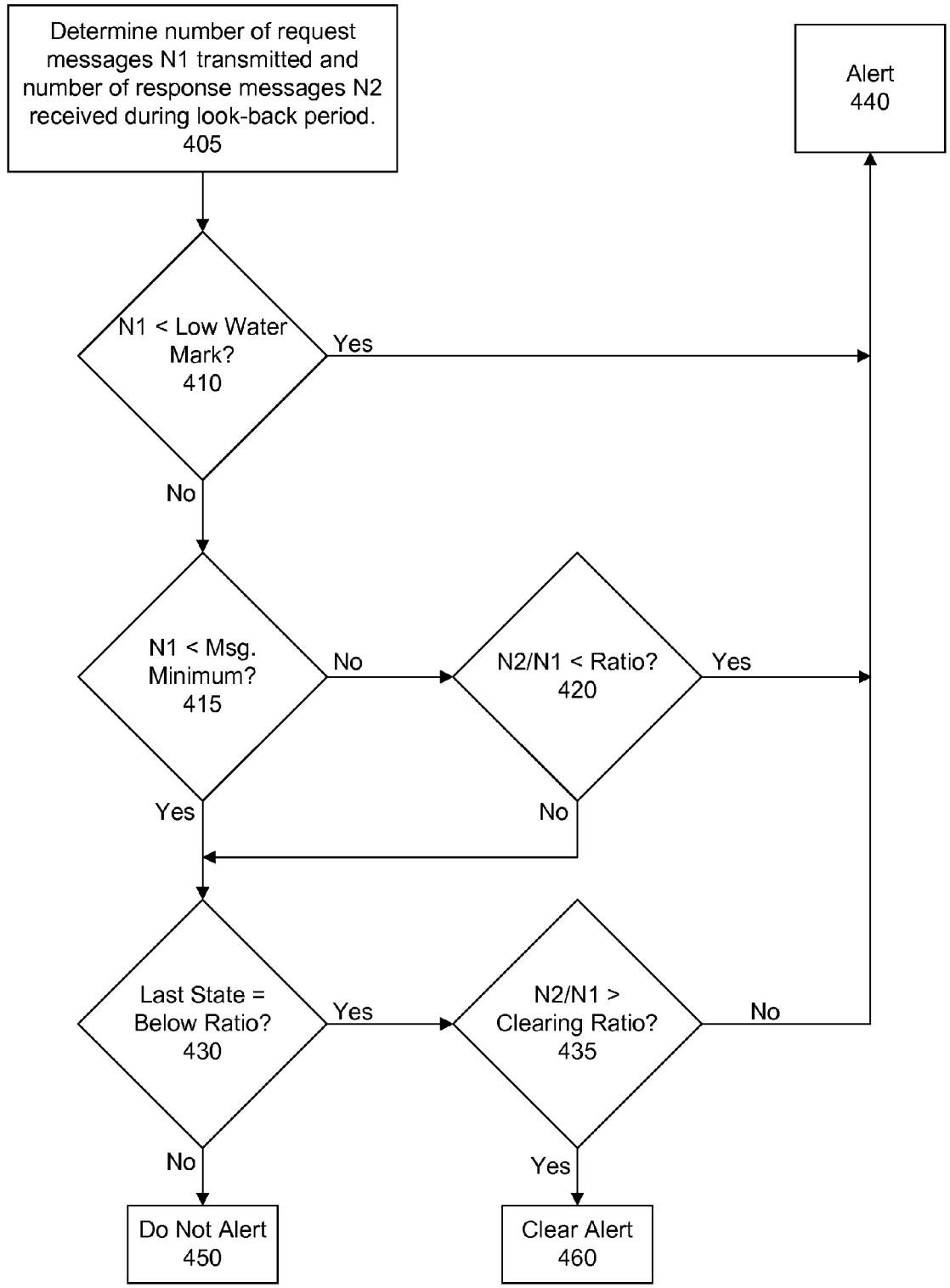
FIG. 4 illustrates a process for detecting an issue, such as an outage, in a system, according to an embodiment.

FIG. 4 illustrates a process for outage or issue detection, according to an embodiment. Initially, in step 405, the job determines the number of messages received during the applicable look-back period. For example, the job determines the number of Z03 messages ("N1") transmitted by Data System A 110 to Data System B 130, and the number of Z04 messages ("N2") received by Data System A 110 from Data System B 130. For example, these numbers may be determined by parsing one or more log files comprising time-stamped indications of messages transmitted and received by Data System A 110. Alternatively, these numbers may be determined by accessing one or more counters (e.g., message-type-specific counters), and optionally resetting each counter following each access.

In step 410, the number of Z03 messages N1 is compared to the low water mark (e.g., low_water_mark parameter). If N1 exceeds the low water mark, an alert is generated in step 440. Otherwise, in step 415, the number of Z03 messages N1 is compared to a minimum or threshold number of messages (e.g., message_minimum parameter) required to trigger a ratio-based alert. As discussed above, this threshold may represent a number which permits a statistically significant comparison with a ratio value.

If N1 is not less than the minimum threshold, then, in step 420, the ratio of Z04 messages to Z03 messages (i.e., N2 divided by N1) is compared to a ratio threshold (e.g., percentage parameter). This ratio threshold may be in the form of a decimal number or an integer (e.g., an integer percentage). It should be understood that the ratio of N2 to N1 may be in or converted to the same form as the ratio threshold. Thus, if the ratio threshold is a percentage, N2 may be divided by N1 and then multiplied by one-hundred to convert the value to a percentage for comparison with the ratio threshold.

If, in step 420, the ratio of N2 to N1 is less than the ratio threshold, an alert is generated in 440. However, if the ratio of N2 to N1 is greater than or equal to the ratio threshold, or if, in step 415, it is determined that N1 is less than the minimum threshold, then the state or result of the last execution of the job is retrieved in step 430. If the last job execution determined that the ratio of Z04 messages to Z03 messages during the former look-back period was below the ratio threshold (i.e., an alert was generated for the preceding look-back period), the ratio of Z04 messages to Z03 messages (i.e. N2/N1) during the current look-back period is compared to the clearing threshold (e.g., clear_percentage parameter) in step 435. Otherwise, no alert is generated, as shown in step 450.

If, in step 435, it is determined that the ratio of N2 to N1 is greater than the clearing threshold, the job clears the alert in step 460. Otherwise, an alert is generated or maintained in step 440.

It should be understood that steps 410, 415, 430 are not limited to the particular order illustrated in FIG. 4, and may be performed in any order. Furthermore, steps 415 and 420 may be performed in any order. Similarly, steps 430 and 435 may also be performed in any order. Other combinations of steps and orders of steps are also possible. In addition, the process illustrated in FIG. 4 is implemented so as to ignore the minimum message requirement (e.g., defined by the message_minimum parameter) for purposes of clearing an alert. It should be understood that, in an alternative embodiment, the process may be slightly modified to require a minimum number of messages prior to clearing an alert.

FIGS. 5A and 5B illustrate example messages which may be transmitted by the described job. FIG. 5A illustrates an alert message that may be transmitted to one or more responsible personnel to notify them that the ratio of Z04 messages to Z03 messages has fallen below a threshold percentage, indicating a potential outage or other issue. FIG. 5B illustrates an example messages that may be transmitted to notify one or more responsible personnel that the ratio of Z04 messages to Z03 messages (as well as other ratios) is above a threshold percentage, indicating a healthy message flow. In an embodiment, the message illustrated in FIG. 5B may be sent when an alert is cleared.

It should be understood that other types of ratios may be used with little to no deviation from the above described implementation. For instance, in an embodiment, instead of determining the ratio of Z04 messages to Z03 messages, the job may instead determine the ratio of duplicate Z03 messages, Z04 messages, or both Z03 and Z04 messages, to total Z03 and/or Z04 messages received. For instance, if the number of Z04 messages received during a look-back period exceeds a minimum (e.g., one-hundred) and the number of duplicate Z04 messages within the total number of Z04 messages received during the look-back period exceeds a certain ratio or percentage (e.g., sixty percent), the job may generate an alert. This alert may be maintained until the percentage of duplicate Z04 messages drops to a certain clearing threshold (e.g., forty percent).

Example Pseudo-Code

Example pseudo-code will now be described to illustrate how processes described herein may be implemented in the context of the Z-messages described above, according to an embodiment. The pseudo-code may be implemented as a software module, written using any suitable programming language, including, without limitation, C/C++, Java, Visual Basic, Perl, and the like. Alternatively, the pseudo-code may be implemented as a hardware module, or as a combination of software and hardware.

Initially, a set of parameters or variables may be defined:

lookback: this parameter defines the look-back period (e.g., in minutes).

direction: this parameter defines the direction of the message. For example, this parameter may comprise a binary data type. A first value may indicate that the process should monitor message flows (e.g., handshakes) initiated by the system (e.g., Data System A 110), whereas a second value may indicate that the process should monitor message flows initiated by another system (e.g., Data System B 130). If the direction is set to the first value, the module may analyze Z01 messages transmitted relative to Z02 messages received, Z03 messages transmitted relative to Z04 messages received, Z05 messages transmitted relative to Z06 messages received, and Z06 messages transmitted relative to Z07 messages received. If the direction is set to the second value, the module may instead analyze Z01 messages received relative to Z02 messages transmitted, Z03 messages received relative to Z04 messages transmitted, Z05 messages received relative to Z06 messages transmitted, and Z06 messages received relative to Z07 messages transmitted.

$z01\_z02\_pct$: this parameter defines the percentage of Z02 responses that must be received/transmitted relative to Z01 requests transmitted/received during the look-back period in order for the message flow to remain within specification (i.e., remain in a non-alert state).

$z03\_z04\_pct$: this parameter defines the percentage of Z04 responses that must be received/transmitted relative to Z03 requests transmitted/received during the look-back period in order for the message flow to remain within specification.

$z05\_z06\_pct$: this parameter defines the percentage of Z06 responses that must be received/transmitted relative to Z05 requests transmitted/received during the look-back period in order for the message flow to remain within specification.

$z06\_z07\_pct$: this parameter defines the percentage of Z07 responses that must be received/transmitted relative to Z06 requests transmitted/received during the look-back period in order for the message flow to remain within specification.

$z01\_lwm$: this parameter defines the number of Z01 messages that must be transmitted/received during the look-back period in order for the message flow to remain within specification.

$z03\_lwm$: this parameter defines the number of Z03 messages that must be transmitted/received during the look-back period in order for the message flow to remain within specification.

$z05\_lwm$: this parameter defines the number of Z05 messages that must be transmitted/received during the look-back period in order for the message flow to remain within specification.

$z06\_lwm$: this parameter defines the number of Z06 messages that must be transmitted/received during the look-back period in order for the message flow to remain within specification.

$z01\_min$: this parameter defines the number of Z01 messages that must be transmitted/received during the look-back period in order for the module to evaluate the Z02-to-Z01 ratio to determine whether the message flow remains within specification.

$z03\_min$: this parameter defines the number of Z03 messages that must be transmitted/received during the look-back period in order for the module to evaluate the Z04-to-Z03 ratio to determine whether the message flow remains within specification.

$z05\_min$: this parameter defines the number of Z05 messages that must be transmitted/received during the look-back period in order for the module to evaluate the Z06-to-Z05 ratio to determine whether the message flow remains within specification.

$z06\_min$: this parameter defines the number of Z06 messages that must be transmitted/received during the look-back period in order for the module to evaluate the Z06-to-Z05 ratio to determine whether the message flow remains within specification. The $z01\_min$, $z03\_min$, $z05\_min$, and/or $z06\_min$ parameter values may each represent a minimum number of messages required to allow a statistically-significant ratio comparison, and may be set manually by a business analyst or other user or may be determined automatically by the system using statistical analysis of historical message flow patterns.

$z01\_clear\_pct$: this parameter defines the percentage of Z02 responses that must be received/transmitted relative to Z01 requests transmitted/received during the look-back period in order for a previous alert to be cleared (e.g., in order to switch from a "RED" or alert state to a "GREEN" or non-alert state).

$z03\_clear\_pct$: this parameter defines the percentage of Z04 responses that must be received/transmitted relative to Z03 requests transmitted/received during the look-back period in order for a previous alert to be cleared.

$z05\_clear\_pct$: this parameter defines the percentage of Z06 responses that must be received/transmitted relative to Z05 requests transmitted/received during the look-back period in order for a previous alert to be cleared.

$z06\_clear\_pct$: this parameter defines the percentage of Z07 responses that must be received/transmitted relative to Z06 requests transmitted/received during the look-back period in order for a previous alert to be cleared.

$z01\_run\_status$: this variable indicates the last-known status for the Z01-Z02 request-response pairing, i.e., the status resulting from the last, prior execution of the module's evaluation of the Z01-Z02 request-response pairing.

$z03\_run\_status$: this variable indicates the last-known status for the Z03-Z04 request-response pairing, i.e., the status resulting from the last, prior execution of the module's evaluation of the Z03-Z04 request-response pairing.

z05_run_status: this variable indicates the last-known status for the Z05-Z06 request-response pairing, i.e., the status resulting from the last, prior execution of the module's evaluation of the Z05-Z06 request-response pairing.

z06_run_status: this variable indicates the last-known status for the Z06-Z07 request-response pairing, i.e., the status resulting from the last, prior execution of the module's evaluation of the Z06-Z07 request-response pairing.

z01_ignore_min_on_clear: this parameter indicates whether or not to permit an alert, resulting from an out-of-specification Z02-to-Z01 percentage, to clear even though the minimum number of Z01 requests, as defined by z01_min, have not been received/transmitted. This parameter may be defined using a binary data type (e.g., Boolean), wherein a value of "true" or one permits clearing of an alert regardless of whether or not the threshold defined by z01_min is met, and a value of "false" or zero prevents clearing unless the threshold defined by z01_min is met.

z03_ignore_min_on_clear: this parameter indicates whether or not to permit an alert, resulting from an out-of-specification Z04-to-Z03 percentage, to clear even though the minimum number of Z03 requests, as defined by z03_min, have not been received/transmitted. This parameter may be defined using a binary data type (e.g., Boolean), wherein a value of "true" or one permits clearing of an alert regardless of whether or not the threshold defined by z03_min is met, and a value of "false" or zero prevents clearing unless the threshold defined by z03_min is met.

z05_ignore_min_on_clear: this parameter indicates whether or not to permit an alert, resulting from an out-of-specification Z06-to-Z05 percentage, to clear even though the minimum number of Z05 requests, as defined by z05_min, have not been received/transmitted. This parameter may be defined using a binary data type (e.g., Boolean), wherein a value of "true" or one permits clearing of an alert regardless of whether or not the threshold defined by z05_min is met, and a value of "false" or zero prevents clearing unless the threshold defined by z05_min is met.

z06_ignore_min_on_clear: this parameter indicates whether or not to permit an alert, resulting from an out-of-specification Z07-to-Z06 percentage, to clear even though the minimum number of Z06 requests, as defined by z06_min, have not been received/transmitted. This parameter may be defined using a binary data type (e.g., Boolean), wherein a value of "true" or one permits clearing of an alert regardless of whether or not the threshold defined by z06_min is met, and a value of "false" or zero prevents clearing unless the threshold defined by z06_min is met.

It should be understood that where a parameter or variable defines a threshold, the threshold may be inclusive of a non-alert condition or inclusive of an alert condition. These parameters and variables may be passed to or defined within the module, and may be manually or automatically and/or dynamically configurable or modifiable. When executed, the module counts, receives, retrieves, or otherwise determines the number Z-messages transmitted and/or received—depending on the direction defined by the direction parameter—during the look-back period defined by the lookback parameter. Using these determined numbers, the module may determine the alert condition for each request-response pairing (i.e., Z01-Z02, Z03-Z04, Z05-Z06, and/or Z06-Z07), based on an algorithm. An example of such an algorithm, as applied to the Z01-Z02 request-response pairing, is described below:

(1) Determine the last-known status for the Z01-Z02 request-response pairing based on the value of z01_run_status.

(2) If the number of Z01 messages is greater than zero, calculate the response percentage of Z02 messages to Z01 messages. Otherwise, if the number of Z01 messages is equal to zero, set the response percentage to one hundred.

(3) If the number of Z01 messages is less than z01_lwm, then set z01_run_status to an alert indication (e.g., RED).

(4) If the number of Z01 messages is greater than or equal to z01_min and the response percentage calculated in step (2) is less than or equal to z01_z02_pct, then set z01_run_status to an alert indication. In an embodiment, the alert indications may comprise granularity to distinguish between alerts based on a number of messages falling below a low water mark (e.g., z01_lwm) and alerts based on a ratio of response messages to request messages falling below a threshold (e.g., z01_z02_pct). For example, the alert indication set in step (3) may be distinguished as a low-water-mark-based alert, whereas the alert indications set in this step and the following steps may be distinguished as a ratio-based alert.

(5) If the number of Z01 messages is greater than or equal to z01_min and the last-known status determined in step (1) was a non-alert indication and the response percentage calculated in step (2) is greater than z01_z02_pct, then set z01_run_status to a non-alert indication.

(6) If the number of Z01 messages is greater than or equal to z01_min and the response percentage calculated in step (2) is greater than z01_clear_pct, then set z01_run_status to a non-alert indication (e.g., GREEN).

(7) If the number of Z01 messages is less than z01_min and z01_ignore_min_on_clear is set to "true" (e.g., one) and the response percentage calculated in step (2) is greater than or equal to z01_clear_pct, then set z01_run_status to a non-alert indication.

(8) If the number of Z01 messages is greater than or equal to z01_min and the last-known status determined in step (1) was an alert indication (e.g., ratio-based alert indication) and the response percentage calculated in step (2) is less than z01_clear_pct, then set z01_run_status to an alert indication.

(9) If none of the conditions in steps (3)-(8) are met, then set z01_run_status to the last-known status determined in step (1).

It should be understood that the algorithm illustrated above may be similarly applied to the Z03-Z04, Z05-Z06, and/or Z06-Z07 request-response pairings. In an embodiment, steps (1)-(9) are repeated for each Z-message request-response pairing, and an individual run status (e.g., z01_run_status, z03_run_status, z05_run_status, and z06_run_status) is determined for each pairing. If all run statuses are set to a non-alert indication, then a run status for the entire module may be set to a non-alert indication. Otherwise, if any of the run statuses are set to an alert indication, the run status for the entire module may be set to an alert indication, triggering alert notifications based on an alert configuration.

Additional Functions and User Interfaces

The data systems 110 and 130 may provide a variety of administrative, configuration, and reporting functions, as well as user interfaces associated with those functions. These user interfaces may comprise job logs, real-time charts, reports, and the like, and can help an administrator or other user determine where a problem lies, e.g., an inbound or outbound queue to a repository, an interface engine, an outage of or within the data system, etc. In addition, access to one or more of these user interfaces may be restricted using roles and/or permissions which provide different levels of access to different users, based on, for example, credentials (e.g., user-name and password, digital certificate, IP address, etc.) submitted using a conventional authentication interface. Systems and methods for registration and authentication are well-known in the art, and will not be described in detail herein.

FIG. 6 illustrates an example user interface that may be provided (e.g., by a web server of Data System A 110), according to an embodiment. The illustrated user interface shows the status of a plurality of job executions in a list format. The list may be searched and/or filtered using conventional techniques, such as querying the list based on user inputs (e.g., keywords, selections of pre-defined filters, date and/or time ranges, and the like). The list provides, for each job execution, an identifier of the job, a short description of the job, the date and time of last completion of the job, the status (e.g., alert or non-alert) resulting from the job execution, the starting date and time of the status, and the elapsed time of the status. As illustrated, in an embodiment, the status of the job may be indicated by a color-coded icon (e.g., red for alert status, green for non-alert status) and/or other icon (e.g., if a job failed to execute or execute to completion).

The list may also provide for modification of specific jobs, and/or selection of an additional user interface or interfaces for modifying a job. Modification of a job may comprise editing parameters or variables, scheduling the job or specifying that the job should only be run manually, setting the number of minutes that a job should wait before refreshing data, setting metadata associated with a job (e.g., name, description, etc.), changing how alerts are managed and/or to whom or what email addresses or other destinations alerts are sent, suspending execution of a job, setting limits on execution time of a job, editing permissions required for executing a job and/or viewing its results, and the like.

Figure 7:
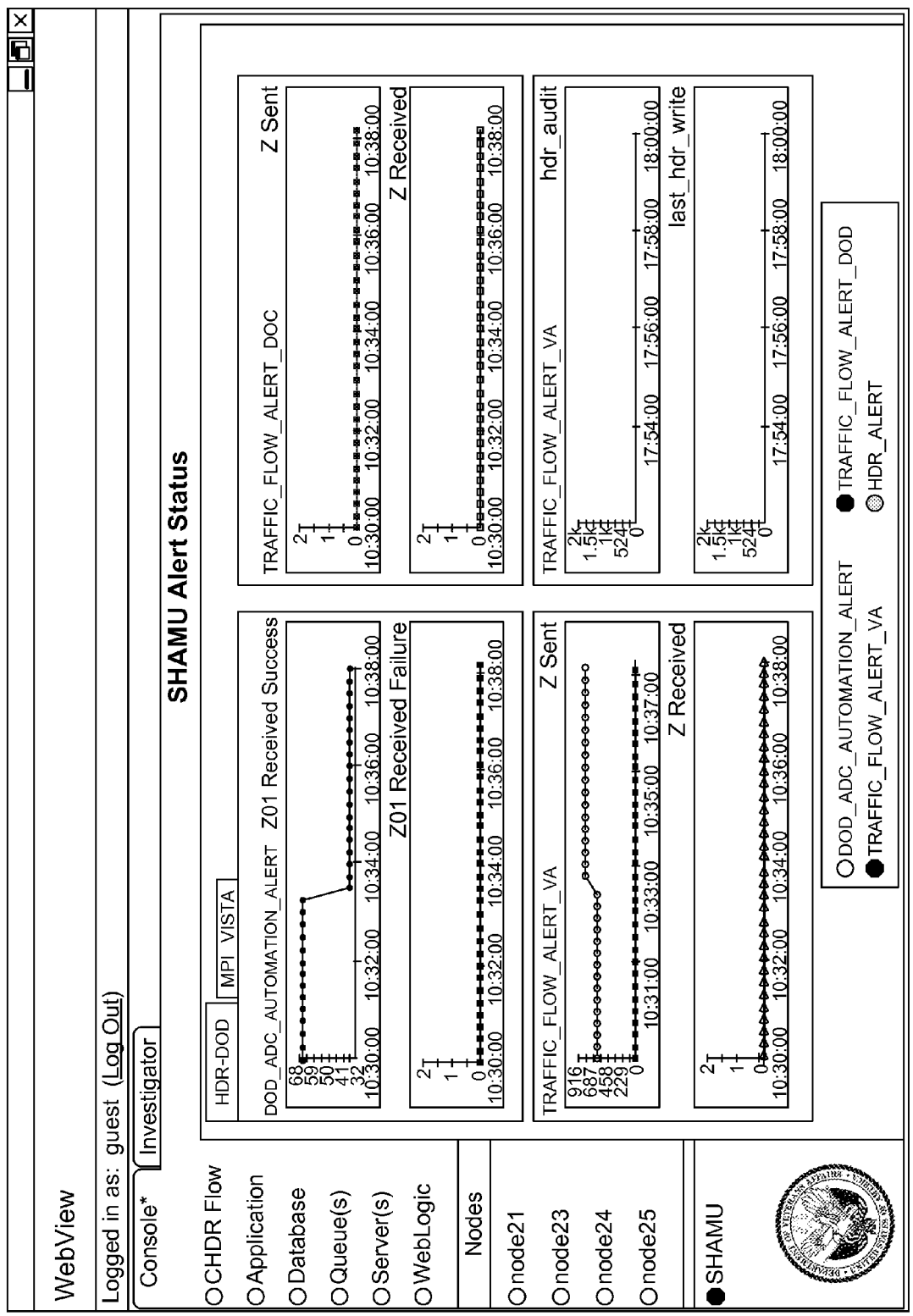

FIG. 7 illustrates an example user interface that may be provided (e.g., by a web server of Data System A 110), according to an embodiment. The illustrated user interface provides a plurality of graphical metrics. For example, for one or more given time intervals, which may be user-specified, the various graphs illustrate metrics, such as the number of messages sent, the number of messages received, ratios of request-response message pairings, alert statuses, reads and/or writes to an associated repository (e.g., Repository A 115), and the like. These graphics may be provided and updated in real time. Additionally or alternatively, a user may select or create reports that will be generated at scheduled times (e.g., daily) and transmitted (e.g., via email or URL) to one or more personnel.

In an embodiment, jobs may be segregated into two or more types of jobs used to monitor overall health of a data system. For instance, each job may be run as a manual service executed at any time to verify traffic flow, or as an automatic service executed at predetermined and configurable times or time intervals. For example, job types may include:

Alert or Trackable Jobs: These jobs run regularly throughout the day (e.g., every 10 minutes, every 30 minutes, etc.) to verify that services are online and that messages are flowing between data systems (e.g., between Data System A 110 and Data System B 130). If not, the jobs can alert (e.g., using email or other communication) appropriate support personnel and/or an interface of another system or module.

Report or Results Jobs: These jobs run at particular times, collect data for message traffic flow, and generate a report. The report may be viewed online, and/or viewed in an email or other message (e.g., SMS text message).

Table 3 describes some example jobs, according to one, illustrative, non-limiting implementation that is specific to the VA system discussed above:

TABLE 3

| Name | Description | Action |
|---|---|---|
| DOD ADC Request Check | Reports on the ADC activation attempts made by the DoD over the past twenty-four hours. Scheduled to run once daily, although available as a service to be run on-demand | No action. |
| DOD ADC Throttle Check | Ensures the ADC automation (Z01s) is within the agreed-upon range. Runs every ten minutes. | Goes RED if VA receives more than twenty activations in one hour. |
| Hourly Breakdown Email | Reports a daily email outlining the counts or messages sent and received for the past twenty-four-hour period. | No action. |
| Message Flow Report Today | Reports the message traffic for the period from midnight to the current time. | No action. |
| Monthly ADC | Reports the current ADC patients from the VA. Delivered for analysis with DoD data. | Sends an email with comma-delimited text file attached. |
| No Traffic Alert | Checks for Z03/Z04 traffic received from the HDR in the past ten minutes. Runs every ten minutes with ten-minute look-back. | Goes RED if message flow is not within expected parameters. |
| Z03-Z04 Frequency Traffic Check | Performs Z03-Z04 correlation traffic check. Has a shorter look-back and checks for VA Z03 requests sent and Z04 responses received during the last ten minutes. Validates that at least one Z03-Z04 pair is correlated. | Goes RED if message flow or correlation is not within expected parameters. |

TABLE 3-continued

| Name | Description | Action |
| --- | --- | --- |
| APP2 Alert | Looks for any Z-messages sent by DoD in last ten minutes. | Goes RED if no DoD traffic received in last ten minutes. |
| DOD ADC Automation Alert | Looks at both the minimum number of DoD ADC attempts over the look-back period and the agreed upon threshold of ADC attempts over the same period. If the minimum number of ADC attempts is not met or the maximum threshold is exceeded, will generate an alert notifying DoD of the current ADC automation setting. | Goes RED if minimum number of attempts is not met or number of attempts exceeds maximum threshold. |
| DOD ADC Request Check | Reports on the ADC activation attempts made by the DoD over the past twenty-four hours. Scheduled to run once daily, although available as a service to be run on-demand. | Counts the number of successful and failed ADC attempts reported in the CHDR audited event table. |
| DOD ADC Throttle Check | Ensures the ADC automation (Z01s) is within the agreed-upon range. Runs every ten minutes. | Goes RED if the VA received more than twenty activations in one hour. |
| Duplication Alert | Looks to see if there are duplications of clinical messages from the DoD. | Goes RED if the minimum number of Z04s received exceeds one hundred, and if duplications are greater than or equal to sixty percent. To clear to GREEN, the duplication rate must fall to forty percent or below. |
| HDR Alert | Checks the count of audited messages sent to the HDR, and then verifies the messages are written to the HDR. The alerting percentage is twenty percent and the clearing percentage is thirty percent. | Goes RED if the percentage of audited messages written into the HDR is below the configured threshold. |
| MPI Alert | Checks connectivity with the Master Patient Index (MPI) and is tied to DoD ADC automation. When a Z01 is received from DoD, the MPI is queried (ADT_A24) to determine ADC status. The count of Z01, Z02, A24, and acknowledgements (ACKs) are recorded and analyzed to determine if there is connectivity with the MPI over the reporting period. | Goes RED if connectivity with the MPI is lost. |
| No DOD Traffic | Checks if any Z03s or Z04s have been received from the DoD in the last ten minutes. Runs every ten minutes with a ten minute look-back. | Goes RED if no DoD traffic is received within the last ten minutes. |
| No HDR Writes Alert | Checks if CHDR has made any writes into the HDR in the last ten minutes. Runs every ten minutes with a ten minute look-back. | Goes RED if no writes to the HDR in the last ten minutes. |
| No Z04 Messages Received | Checks if any Z04s have been received from the DoD within the past ten minutes. Runs every ten minutes with a ten minute look-back. | Goes RED if receiving Z03s but no Z04s from DoD. |
| Traffic Flow Alert DoD | Monitors message traffic for all handshakes for messages initiated by the DoD. Looks at the counts of messages sent and received and includes configurations for each handshake. | Goes RED if the minimums are not met or the response rate is below the configured settings for the message pairs. |
| Traffic Flow Alert VA | Monitors message traffic for all handshakes for messages initiated by the VA. Looks at the counts of messages sent and | Goes RED if the minimums are not met or the response rate is below the configured settings for the message |

TABLE 3-continued

| Name | Description | Action |
| --- | --- | --- |
| | received and includes configurations for each handshake. | pairs. |
| Vista Alert | Checks for clinical messages (Z03s) sent from the VA to DoD over the reporting period. and the last reported Z03 is recorded in the job result. | Goes RED if the number of messages is below the configured low water mark |

Example Processing Device

Figure 8:
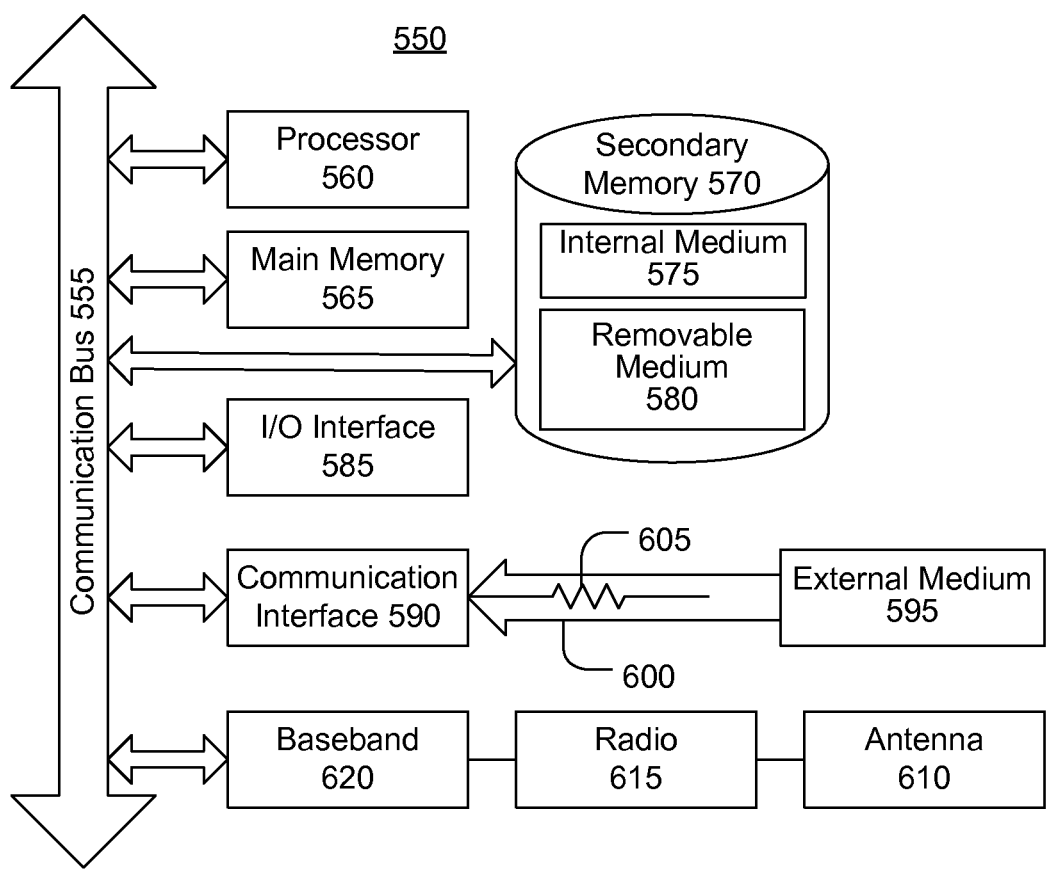
FIG. 8 illustrates a processing system on which one or more of the processes described herein may be executed, according to an embodiment.

FIG. 8 is a block diagram illustrating an example wired or wireless system 550 that may be used in connection with various embodiments described herein. For example the system 550 may be used as or in conjunction with one or more of the mechanisms or processes described above, and may represent components of server(s) 110, user system(s) 130, and/or other devices described herein. The system 550 can be a server or any conventional personal computer, or any other processor-enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560. Examples of processors which may be used with system 550 include, without limitation, the Pentium® processor, Core i7® processor, and Xeon® processor, all of which are available from Intel Corporation of Santa Clara, Calif.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 550 preferably includes a main memory 565 and may also include a secondary memory 570. The main memory 565 provides storage of instructions and data for programs executing on the processor 560, such as one or more of the functions and/or modules discussed above. It should be understood that programs stored in the memory and executed by processor 560 may be written and/or compiled according to any suitable language(s), including without limitation Ruby, C/C++, Java, JavaScript, Perl, Visual Basic, .NET, and the like. The main memory 565 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 570 may optionally include an internal memory 575 and/or a removable medium 580, for example a floppy disk drive, a magnetic tape drive, a compact disc (CD) drive, a digital versatile disc (DVD) drive, other optical drive, a flash memory drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer-readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage media 580 and communication interface 590, which allow software and data to be transferred from an external medium 595 to the system 550.

System 550 may include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device.

Communication interface 590 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

In an embodiment, I/O interface 585 provides an interface between one or more components of system 550 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 550 also includes optional wireless communication components that facilitate wireless communication over a voice and over a data network. The wireless communication components comprise an antenna system 610, a radio system 615 and a baseband system 620. In the system 550, radio frequency (RF) signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality.

Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method for detecting an issue with a message flow between two or more data systems, the method comprising, by at least one hardware processor of a first data system:
    at a first time,
        determining a number of first request messages transmitted during a first look-back period,
        determining a number of first response messages received during the first look-back period,
        calculating a first ratio of the number of first response messages to the number of first request messages,
        comparing the first ratio to an alerting threshold, and
        generating a first alert based on the comparison of the first ratio to the alerting threshold; and,
    at a second time, after the first time and after the alert has been generated,
        determining a number of second request messages transmitted during a second look-back period,
        determining a number of second response messages received during the second look-back period,
        calculating a second ratio of the number of second response messages to the number of second request messages,
        comparing the second ratio to a clearing threshold, and
        determining whether to maintain or clear the alert based on the comparison of the second ratio to the clearing threshold;
    wherein the method further comprises, at the first time, comparing the number of first request messages transmitted during the first look-back period to a minimum, wherein calculating the first ratio, comparing the first ratio to the alerting threshold, and generating the first alert are only performed if the number of first request messages is greater than or greater than or equal to the minimum.

2. The method of claim 1, wherein generating a first alert based on the comparison of the first ratio to the alerting threshold comprises generating the first alert if the first ratio is less than the alerting threshold.

3. The method of claim 1, wherein generating a first alert based on the comparison of the first ratio to the alerting threshold comprises generating the first alert if the first ratio is less than or equal to the alerting threshold.

4. The method of claim 1, wherein determining whether to maintain or clear the alert based on the comparison of the second ratio to the clearing threshold comprises:
    if the second ratio is less than the clearing threshold, maintaining the alert; and,
    if the second ratio is greater than the clearing threshold, clearing the alert.

5. The method of claim 1, further comprising, at the second time, comparing the number of second request messages transmitted during the second look-back period to the minimum, wherein calculating the second ratio, comparing the second ratio to the clearing threshold, and determining whether to maintain or clear the alert are only performed if the number of second request messages is greater than or greater than or equal to the minimum.

6. The method of claim 1, further comprising, at the first time, transmitting a message comprising an indication of the alert to one or more recipients.

7. The method of claim 6, further comprising, at the second time:
    if it has been determined that the alert is to be maintained, transmitting a message comprising an indication of the alert to one or more recipients; and, if it has been determined that the alert is to be cleared, transmitting a message comprising an indication of a non-alert status to one or more recipients.

8. The method of claim 1, wherein the first request messages and the second request messages are transmitted by the first data system to a second data system, and wherein the first response messages and the second response messages are received by the first data system from the second data system.

9. The method of claim 1, further comprising, at one or both of the first time and the second time:
    comparing the number of request messages transmitted during the first look-back period to a low water mark; and,
    if the number of request messages is less than the low water mark, generating an alert.

10. A method for detecting an issue with a message flow between two or more data systems, the method comprising, by at least one hardware processor of a first data system:
    at a first time,
        determining a number of first request messages transmitted during a first look-back period,
        determining a number of first response messages received during the first look-back period,
        calculating a first ratio of the number of first response messages to the number of first request messages,
        comparing the first ratio to an alerting threshold, and,
        generating a first alert based on the comparison of the first ratio to the alerting threshold; and,
    at a second time, after the first time and after the alert has been generated,
        determining a number of second request messages transmitted during a second look-back period,
        determining a number of second response messages received during the second look-back period,
        calculating a second ratio of the number of second response messages to the number of second request messages,
        comparing the second ratio to a clearing threshold, and
        determining whether to maintain or clear the alert based on the comparison of the second ratio to the clearing threshold;
    wherein the method further comprises, at one or both of the first time and the second time, comparing the number of request messages transmitted during the first look-back period to a low water mark, and, if the number of request messages is less than the low water mark, generating an alert.

11. The method of claim 10, wherein generating a first alert based on the comparison of the first ratio to the alerting threshold comprises generating the first alert if the first ratio is less than the alerting threshold.

12. The method of claim 10, wherein generating a first alert based on the comparison of the first ratio to the alerting threshold comprises generating the first alert if the first ratio is less than or equal to the alerting threshold.

13. The method of claim 10, wherein determining whether to maintain or clear the alert based on the comparison of the second ratio to the clearing threshold comprises:
    if the second ratio is less than the clearing threshold, maintaining the alert; and,
    if the second ratio is greater than the clearing threshold, clearing the alert.

14. The method of claim 10, further comprising, at the first time, comparing the number of first request messages transmitted during the first look-back period to a minimum, wherein calculating the first ratio, comparing the first ratio to the alerting threshold, and generating the first alert are only performed if the number of first request messages is greater than or greater than or equal to the minimum.

15. The method of claim 14, further comprising, at the second time, comparing the number of second request messages transmitted during the second look-back period to the minimum, wherein calculating the second ratio, comparing the second ratio to the clearing threshold, and determining whether to maintain or clear the alert are only performed if the number of second request messages is greater than or greater than or equal to the minimum.

16. The method of claim 10, further comprising, at the first time, transmitting a message comprising an indication of the alert to one or more recipients.

17. The method of claim 16, further comprising, at the second time:
    if it has been determined that the alert is to be maintained, transmitting a message comprising an indication of the alert to one or more recipients; and,
    if it has been determined that the alert is to be cleared, transmitting a message comprising an indication of a non-alert status to one or more recipients.

18. The method of claim 10, wherein the first request messages and the second request messages are transmitted by the first data system to a second data system, and wherein the first response messages and the second response messages are received by the first data system from the second data system.

19. A system for detecting an issue with a message flow between two or more data systems, the system comprising:
    at least one hardware processor; and
    at least one executable software module that, when executed by the at least one hardware processor,
        at a first time,
            determines a number of first request messages transmitted during a first look-back period,
            determines a number of first response messages received during the first look-back period,
            calculates a first ratio of the number of first response messages to the number of first request messages,
            compares the first ratio to an alerting threshold, and,
            generates a first alert based on the comparison of the first ratio to the alerting threshold, and,
        at a second time, after the first time and after the alert has been generated,
            determines a number of second request messages transmitted during a second look-back period,
            determines a number of second response messages received during the second look-back period,
            calculates a second ratio of the number of second response messages to the number of second request messages,
            compares the second ratio to a clearing threshold, and
            determines whether to maintain or clear the alert based on the comparison of the second ratio to the clearing threshold;
    wherein the at least one executable software module, at the first time, compares the number of first request messages transmitted during the first look-back period to a minimum, wherein calculating the first ratio, comparing the first ratio to the alerting threshold, and generating the first alert are only performed if the number of first request messages is greater than or greater than or equal to the minimum.

20. The system of claim 19, wherein generating a first alert based on the comparison of the first ratio to the alerting threshold comprises generating the first alert if the first ratio is less than the alerting threshold.

21. The system of claim 19, wherein generating a first alert based on the comparison of the first ratio to the alerting threshold comprises generating the first alert if the first ratio is less than or equal to the alerting threshold.

22. The system of claim 19, wherein determining whether to maintain or clear the alert based on the comparison of the second ratio to the clearing threshold comprises:
if the second ratio is less than the clearing threshold, maintaining the alert; and,
if the second ratio is greater than the clearing threshold, clearing the alert.

23. The system of claim 19, wherein the at least one executable software module, at the second time, compares the number of second request messages transmitted during the second look-back period to the minimum, wherein calculating the second ratio, comparing the second ratio to the clearing threshold, and determining whether to maintain or clear the alert are only performed if the number of second request messages is greater than or greater than or equal to the minimum.

24. The system of claim 19, wherein the at least one executable software module, at the first time, transmits a message comprising an indication of the alert to one or more recipients.

25. The system of claim 24, wherein the at least one executable software module, at the second time:
if it has been determined that the alert is to be maintained, transmits a message comprising an indication of the alert to one or more recipients; and,
if it has been determined that the alert is to be cleared, transmits a message comprising an indication of a non-alert status to one or more recipients.

26. The system of claim 19, wherein the first request messages and the second request messages are transmitted by the first data system to a second data system, and wherein the first response messages and the second response messages are received by the first data system from the second data system.

27. The system of claim 19, wherein the at least one executable software module, at one or both of the first time and the second time:
compares the number of request messages transmitted during the first look-back period to a low water mark; and,
if the number of request messages is less than the low water mark, generates an alert.

28. A system for detecting an issue with a message flow between two or more data systems, the system comprising:
at least one hardware processor; and
at least one executable software module that, when executed by the at least one hardware processor,
at a first time,
determines a number of first request messages transmitted during a first look-back period,
determines a number of first response messages received during the first look-back period,
calculates a first ratio of the number of first response messages to the number of first request messages,
compares the first ratio to an alerting threshold, and
generates a first alert based on the comparison of the first ratio to the alerting threshold, and
at a second time, after the first time and after the alert has been generated,
determines a number of second request messages transmitted during a second look-back period,
determines a number of second response messages received during the second look-back period,
calculates a second ratio of the number of second response messages to the number of second request messages,
compares the second ratio to a clearing threshold, and
determines whether to maintain or clear the alert based on the comparison of the second ratio to the clearing threshold;
wherein the at least one executable software module, at one or both of the first time and the second time, compares the number of request messages transmitted during the first look-back period to a low water mark, and, if the number of request messages is less than the low water mark, generates an alert.

29. The system of claim 28, wherein generating a first alert based on the comparison of the first ratio to the alerting threshold comprises generating the first alert if the first ratio is less than the alerting threshold.

30. The system of claim 28, wherein generating a first alert based on the comparison of the first ratio to the alerting threshold comprises generating the first alert if the first ratio is less than or equal to the alerting threshold.

31. The system of claim 28, wherein determining whether to maintain or clear the alert based on the comparison of the second ratio to the clearing threshold comprises:
if the second ratio is less than the clearing threshold, maintaining the alert; and,
if the second ratio is greater than the clearing threshold, clearing the alert.

32. The system of claim 28, wherein the at least one executable software module, at the first time, transmits a message comprising an indication of the alert to one or more recipients.

33. The system of claim 32, wherein the at least one executable software module, at the second time:
if it has been determined that the alert is to be maintained, transmits a message comprising an indication of the alert to one or more recipients; and,
if it has been determined that the alert is to be cleared, transmits a message comprising an indication of a non-alert status to one or more recipients.

34. The system of claim 28, wherein the first request messages and the second request messages are transmitted by the first data system to a second data system, and wherein the first response messages and the second response messages are received by the first data system from the second data system.

35. The system of claim 28, wherein the at least one executable software module, at the first time, compares the number of first request messages transmitted during the first look-back period to a minimum, wherein calculating the first ratio, comparing the first ratio to the alerting threshold, and generating the first alert are only performed if the number of first request messages is greater than or greater than or equal to the minimum.

36. The system of claim 28, wherein the at least one executable software module, at the second time, compares the number of second request messages transmitted during the second look-back period to the minimum, wherein calculating the second ratio, comparing the second ratio to the clearing threshold, and determining whether to maintain or clear the alert are only performed if the number of second request messages is greater than or greater than or equal to the minimum.

* * * * *